Feb. 2, 1965   F. J. L. DORL   3,168,360
TAPERED BALL BEARING
Filed Jan. 21, 1963

INVENTOR.
FRANCIS J. L. DORL
BY
Hammond + Littell
ATTORNEYS 3,168,360
TAPERED BALL BEARING
Francis J. L. Dori, 17 Mountain Ave., Summit, N.J.
Filed Jan. 21, 1963, Ser. No. 252,722
3 Claims. (Cl. 308—193)

The invention relates to an improved tapered ball bearing which can withstand radial as well as axial or thrust loads at the same time with little friction.

At the present time tapered roller bearings are generally used where the bearings are to be subjected to radial and axial loads. In any tapered bearing the conical lines of the inner race and the outer race and the lines of the tapered rollers must meet at one point in the center of the shaft of the bearing called the apex point.

The tapered roller bearings have inherent defects which limit their advantageous use. The rollers abut against a retaining flange which is usually an integral part of the inner race. The flange prevents the rollers from slipping out of the bearings. However, when pressure is applied to the tapered roller bearing, the rollers are pressed hard against the flange and serious sliding or bouncing or bubbling friction occurs due to the rotation of the flange in one direction and the rollers in a counter direction. The friction not only causes wear and tear on the rollers and the retaining flange; it also tends to deviate the rollers from the apex point.

Another structural defect in a tapered roller bearing is due to the fact that the tapered rollers themselves are rigid rods of comparatively long length. In order for the bearing to function properly, the rollers must be maintained in line with the apex point. If one end of the roller is moved away from its fixed position, there is an angular deflection of the roller from the apex point which creates wear on the rollers. Attempts have been made to machine the cage which holds the rollers during assembly, so that it will hold the rollers in line with the apex point during use, but this is not economically feasible.

One of the prior art attempts to overcome the deficiencies of the tapered roller bearings is illustrated by U.S. Patent No. 1,671,372 by Leedham. The Leedham bearing consists of a plurality of rows of balls of decreasing size running in grooved tracks on the inner cone. The grooved tracks are placed close together so that the balls in one groove lie partly between the balls in the adjacent groove. The Leedham bearings do not absorb any inward movement caused by the pressure of the thrust loads and are not satisfactory.

A practical solution to the problems of the tapered roller bearings is described in my earlier U.S. Patent No. 3,070,412 which describes a tapered ball bearing comprising an inner cone having an end thrust flange and other flanges to provide a plurality of flat tracks on the inner cone, a plurality of rows of balls of decreasing diameter in the flat tracks and outer bearing cup. This tapered ball bearing functions well but it is costly to produce due to the precision needed to machine the inner cone with a plurality of flat tracks and flanges.

It is an object of the invention to provide an improved, economical tapered ball bearing capable of withstanding axial and thrust loads.

It is another object of the invention to provide an improved tapered ball bearing which avoids the defects of a tapered roller bearing.

These and other objects and advantages of the invention will become obvious from the following detailed description.

The improved tapered ball bearing of the invention comprises an inner cone having an integral end thrust flange, a plurality of rows of balls of decreasing diameter resting on the inner cone and separated by loose, movable rings or "free-floating flanges" and an outer bearing cup. By having only an end thrust flange on the inner cone of the tapered ball bearing and replacing the other flanges of the bearing described in my Patent No. 3,070,412 with loose, movable rings, the inner cones of the invention can be produced with the present equipment of the bearing industry and no special machining is needed. Therefore, the bearings of the present invention are more economical than the tapered ball bearing of my earlier patent. Also, the present bearing is more suitable for many installations where the thrust loads are light and the tapered angle is shallow.

Referring now to the drawings, which are illustrative of various preferred embodiments of the invention:

Figure 1:
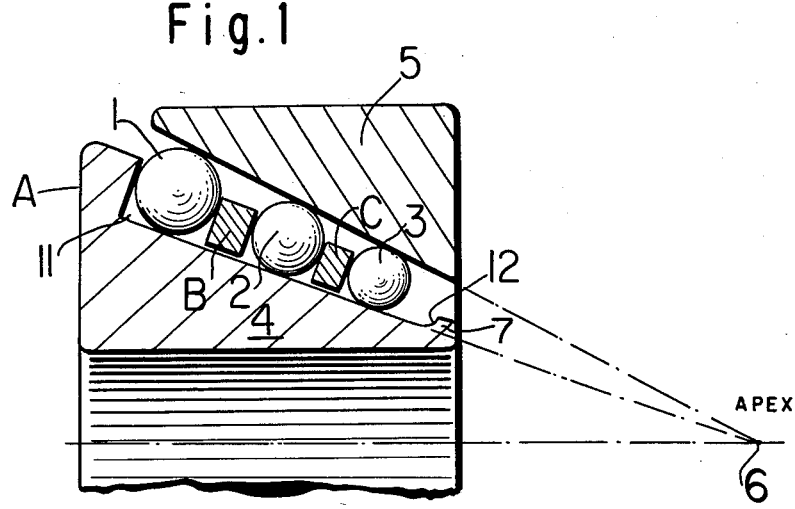
FIG. 1 is a sectional view through an upper portion of a tapered ball bearing with three rows of balls of diminishing size.

In the embodiment illustrated by FIG. 1, the tapered ball bearing is comprised of inner cone 4 with an integral end thrust flange A and a small protrusion 7 which serves to hold the rows of balls in place during assembly. The conical or tapered race surface of the inner cone from corner 11 to point 12 is a straight, continuous surface when viewed in cross-section. The surface of the outer race or cup 5 of the bearing is also a straight, continuous surface. The inner and outer cones of the present bearings are the same as the inner and outer cones of tapered roller bearings. When the bearing is assembled, the imaginary extended lines of the two said surfaces meet at the apex point 6, which is in the center of the shaft of the assembled bearing, the axis of which is diagrammatically represented by the horizontal line. On the conical surface of the inner cone, rows of balls of diminishing size indicated as 1, 2 and 3 are resting with row 1 resting against end thrust flange A. Between rows 1 and 2 and rows 2 and 3 are loose movable rings B and C, respectively, which might also be called free-floating flanges, since they are loose and are pushed backwards (up the inclined race surface) when subjected to thrust loads allowing the rows of balls to absorb the thrust loads.

The protrusion 7 on the inner cone does not serve any functional purpose once the bearing is assembled and may be omitted altogether if desired. However, the protrusion should be low enough to permit the loose, movable rings B and C to pass over it during assembly.

Each loose, movable ring has preferably a height, which is greater than one-half of the diameter of the smaller balls adjacent to it but less than the diameter of the said balls. In this way, a tangential point of contact is made between the balls and the loose, movable rings. If desired, slight grooves may be provided in the said rings to produce a larger contact surface between the balls and the said rings.

The loose, movable rings rest lightly on the surface of the inner race and they may be slightly rounded or chamfered, where they contact the said surface. To aid the movement of the movable rings on the surface of the inner cone, it is preferred to use a lubricant, where the said rings and the inner cone touch.

Figure 2:
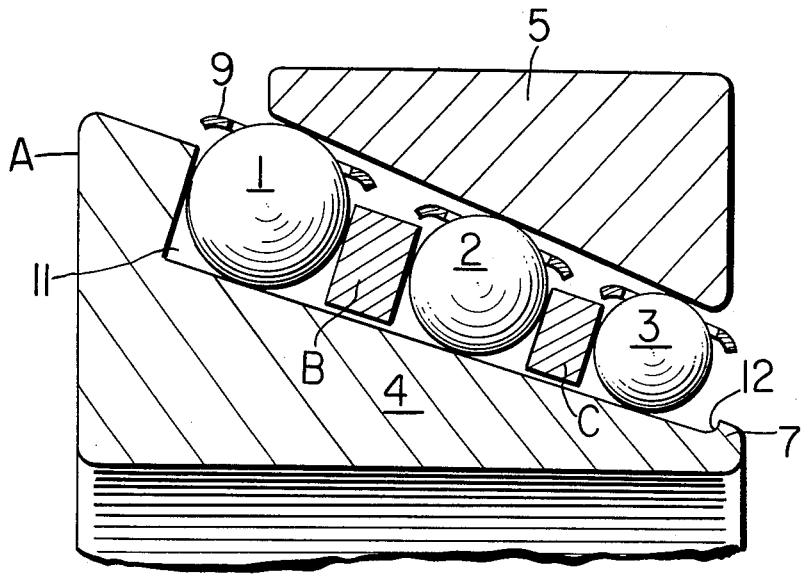
FIG. 2 is a sectional view through an upper portion of a tapered ball bearing, in which the balls of diminishing size are held by a cage for easy assembly.

FIG. 2 illustrates a modification of the embodiment of FIG. 1 wherein each row of balls 1, 2 and 3 is held by a cage 9 for easy assembly. The openings in the cages should be suitably, rounded slots (directed to apex) less than the diameter of the balls, so as to permit the inward movements of the balls; otherwise the cage may be made in a conventional manner. Rings B and C are mounted between each row of balls as in the embodiment of FIG. 1.

While the tapered ball bearing illustrated in FIGS. 1 and 2 show three rows of balls, two or more rows of balls of diminishing size may be used depending upon the desired load capacity of the bearing. The balls and the loose, movable rings may be made of any suitable material but are preferably made out of hardened steel.

The tapered ball bearing of the invention avoids the friction and alignment problems of the tapered roller bearing and is economical to produce.

While the preferred forms of embodiments have been illustrated, various modification of the invention may be made without departing from the spirit or scope thereof, and it is to be understood that the invention is to be limited only as defined in the appended claims.

I claim:

1. A tapered ball bearing, comprising an inner cone tapering in one direction, and having an end-thrust flange on one end, and a smooth race surface tapering downwardly therefrom; a plurality of rows of balls of decreasing diameter resting on the tapered inner cone; loose, movable rings separating said rows of balls and a tapered outer bearing cup, having a smooth race surface, the taper of the cone and the bearing cup being such that the extended lines of said tapered surfaces meet on the axis of the shaft of the assembled bearing.

2. A tapered ball bearing, comprising an inner cone tapering in one direction, and having an end thrust flange on one end, and a smooth race surface tapering downwardly therefrom, three rows of balls of decreasing diameter resting on the tapered inner cone, loose movable rings separating said rows of balls and a tapered outer bearing cup, having a smooth race surface, the taper of the cone and the bearing cup being such that the extended lines of said tapered surfaces meet on the axis of the shaft of the assembled bearing.

3. A tapered ball bearing, comprising an inner cone tapering in one direction, and having an end thrust flange on one end, and a smooth race surface tapering downwardly therefrom, a plurality of rows of balls of decreasing diameter resting on the inner cone, loose movable rings separating said rows of balls, cages to hold the balls, and a tapered outer bearing cup having a smooth race surface, the taper of the cone and the bearing cup being such that the extended lines of said tapered surfaces meet on the axis of the shaft of the assembled bearing.

References Cited by the Examiner
UNITED STATES PATENTS

| | | | |
|---|---|---|---|
| 626,274 | 6/99 | Foidart | 208—174 |
| 1,404,430 | 1/22 | Brush | 308—214 |
| 1,645,345 | 10/27 | Okner | 308—174 X |
| 1,671,372 | 5/28 | Leedham | 308—174 X |
| 2,523,238 | 9/50 | Tarbutton | 308—174 X |
| 3,070,412 | 12/62 | Dorl | 308—174 |

ROBERT C. RIORDON, *Primary Examiner.*

FRANK SUSKO, *Examiner.*